J. HOPKINSON.
SCALE.
APPLICATION FILED JULY 1, 1915.

1,339,759.

Patented May 11, 1920.
2 SHEETS—SHEET 1.

Attest.
Edw. G. Freed
H. Folker

Inventor.
Joseph Hopkinson
BY
Kerr Page Cooper + Hayward
attys

J. HOPKINSON.
SCALE.
APPLICATION FILED JULY 1, 1915.

1,339,759.

Patented May 11, 1920.
2 SHEETS—SHEET 2.

Attest.
Edw. G. Freed
H. Folker

Inventor.
Joseph Hopkinson
BY
Kerr Page Cooper + Hayward
Atty's

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

SCALE.

1,339,759.

Specification of Letters Patent.  Patented May 11, 1920.

Application filed July 1, 1915. Serial No. 37,434.

*To all whom it may concern:*

Be it known that I, JOSEPH HOPKINSON, a citizen of the United States, residing at Dayton, in the county of Montgomery and State of Ohio, have invented certain new and useful Improvements in Scales, of which the following is a full, clear, and exact description.

This invention relates to certain improvements in scales and pertains particularly to a system of levers and counterbalances that adapts a scale to handle a wide range of loads and at the same time provides a mechanism which is uniformly accurate and easily read at the different loads. My invention comprises novel connecting devices for transmitting the motion of the platform to the indicating devices. These connections are so arranged that heavy loads can be weighed and the weight indicated automatically without the necessity of the operator performing a number of balancing operations.

Another object of my invention is to provide a suitable tare device to the weight indicating mechanism so that the tare weight on the commodity support can be read directly and to provide means for reading the commodity weight directly without subtracting the tare weight.

Another object of my invention is to provide connections between the commodity support and the indicating devices to which the operator can apply additional counterbalancing weights if the load on the commodity support exceeds the capacity of the indicating devices. By the application of such counterbalancing weights the weight on the commodity support is balanced to an amount equal to the capacity of the indicating devices and any excess can be read directly from the weight indicating hand or drum. In this way the capacity of the scale can be easily increased when heavy weights are weighed and yet the fine divisions of weight are automatically indicated.

To these and other ends my invention consists in the devices shown in the accompanying drawings and more particulariy pointed out in the appended claims.

Figure 1:
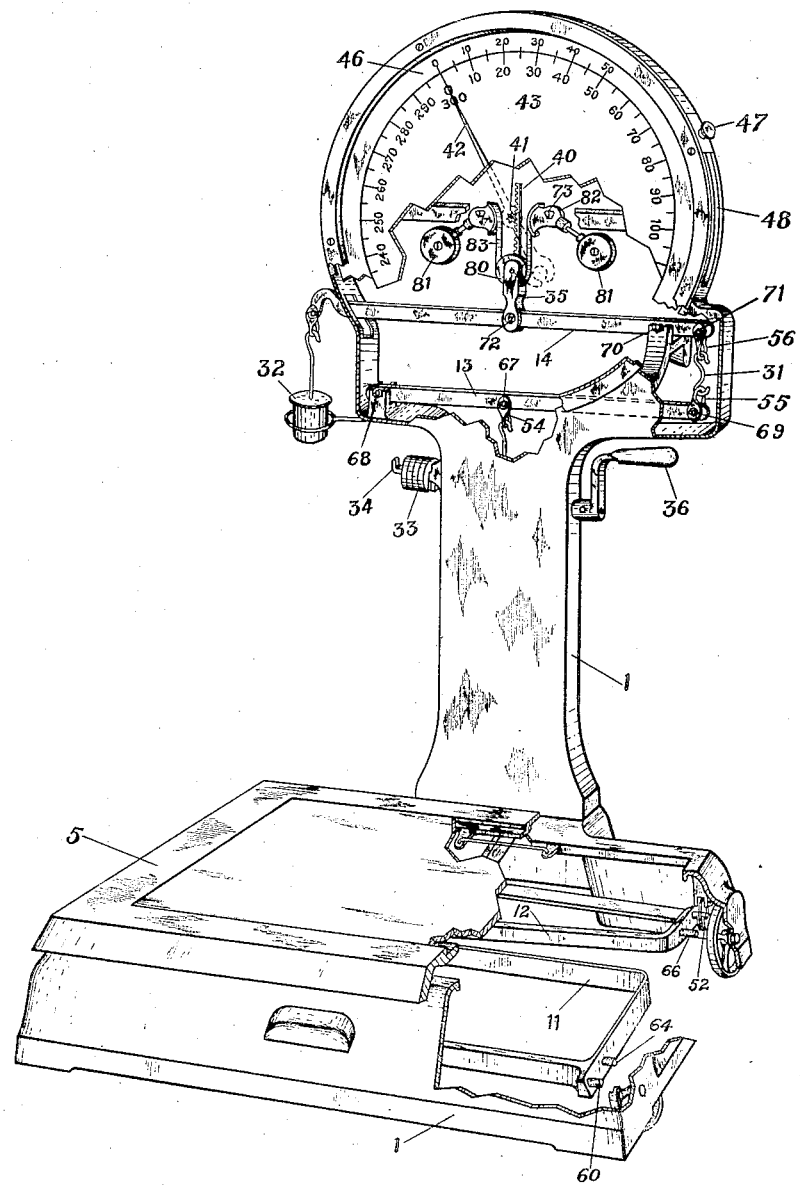
Figure 1 shows a scale showing my improved construction certain portions of the housing being broken away to show the mechanism.
Figure 2:
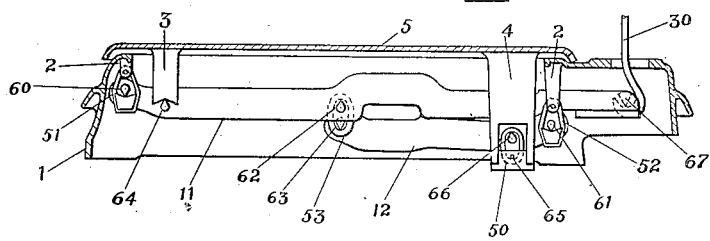
Fig. 2 shows a side view of the levers in the base.

In more detail in Figs. 1 and 2, 1 is the base or frame of the scale. 2 are lugs which extend downwardly from the lower side of the base and which by means of pins support the hanging V bearing loops 51 and 52. Knife edge pivots 60 are mounted in the forward end of the long lever 11 and with V bearing loop 51 form the fulcrum for this lever. A short lever 12 is supported at its one end by a knife pivot 61, which bears on a V bearing loop 52, which is suspended from the lug 2 extending downwardly from the base.

The long lever 11 and short lever 12 are connected by the loops 53 and coöperating pivots 62 and 63 in such a manner that the assembly forms a compound lever. The long lever 11 has a knife pivot 64 which supports the abutment 3 of the commodity support or platform 5. The other side of the commodity support is supported on the short lever 12 by means of the abutment 4, pins 65, platform hanger loops 50 and knife edges 66. The rear end of the long lever carries a knife edge pivot 67 which coöperates with the hooked end of steelyard rod 30. It will be seen that the commodity support 5 is carried upon a compound lever formed of levers 11 and 12 and pivoted in such a manner that it forms a lever of the second order.

Figure 3:
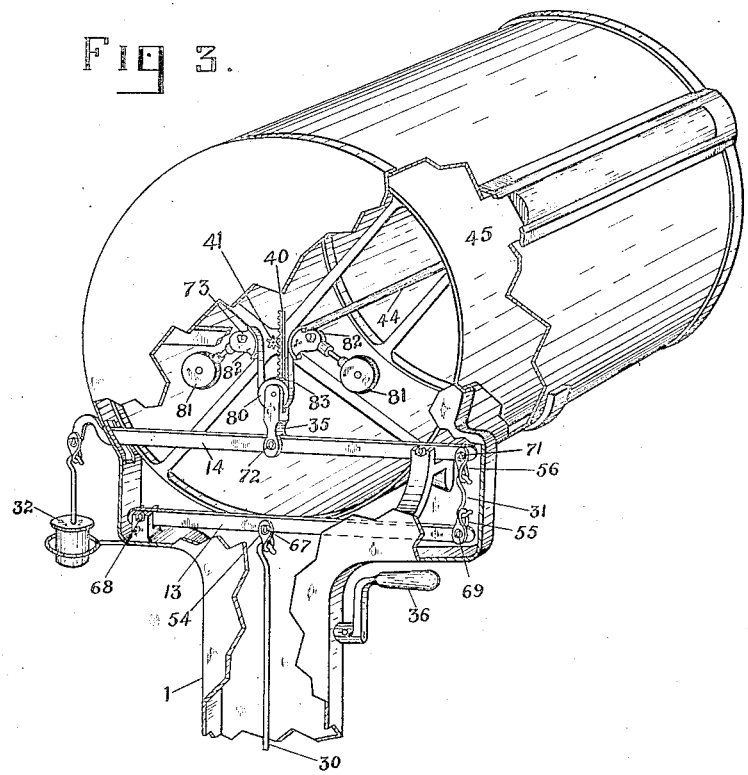
Fig. 3 shows a detail view of the scale levers and their connection to a drum indicating device.

The steelyard rod 30 extends upwardly through the pedestal of the scale and at its looped upper end connects with the V bearing loop 54 which is supported upon the knife edge pivot 67 on the intermediate lever 13, see Figs. 1 and 3. This intermediate lever is a lever of the second order being fulcrumed to the frame of the scale by means of the knife edge pivot 68. The opposite end of this lever 13 carries a knife edge pivot 69 which coöperates with a bearing loop 55.

An extension of the frame carries a bearing which supports the knife edge pivot 70, (see Fig. 1). This pivot 70 is mounted in and forms the fulcrum for a scale beam lever 14. This scale beam lever 14 is connected to the intermediate lever 13 by means of pivot 71 which, through bearing loop 56, connects with the link 31 which connects with the previously mentioned V bearing loop 55 connecting with lever 13.

The scale beam 14, which is a lever of the first order, at its opposite end is adapted through the pivot and V bearing loop to support a counter balance 32. This counter balance 32 has a double function. It is adapted to counterbalance the normal weight of the levers and linkages and is also adapted to be used as a support for additional counterbalancing weights when heavy loads are weighed on the scale, which loads exceed the normal capacity of the weight indicating devices. The manner in which these extra weights are applied will be hereafter explained.

At a point midway between the ends of lever 14 is a knife edge pivot 72 which bears downwardly against a bearing in the member 35 which is bifurcated at its upper end and which carries on a shaft the equalizing roller 80. Also connected to the member 35 and extending upwardly therefrom is a rack bar 40 which meshes with a pinion 41. The pinion 41 is suitably connected to a pointer 42 as shown in Fig. 1. The pointer is adapted to travel over a graduated weight chart 43 and indicate the weight on the scale. I do not wish to limit myself to a pointer and circular weight chart as it is apparent that the pinion 41 may be fastened on the end of a shaft 44, Fig. 3, which shaft carries a drum 45 with a chart on its periphery. This drum is of a type well known in computing scales and may indicate the price as well as the amount weighed. The drum type of indicating mechanism is shown in Fig. 3.

Pendulums 81 are rigidly connected to compensating cams 82. The compensating cams are pivotally mounted in bearings on the frame (not shown) by means of knife pivots 73. A flexible tape 83 is fastened to the upper end of each of the compensating cams and wraps on the cam surfaces. The intermediate portion of the tape, between the cams, loops downwardly under the equalizing roller 80 and so connects the pendulums with the scale beam 14.

When the scale is normal or at no load position, the compound levers 11 and 12, in the base of the scale and connecting elements, serve to hold the pendulums 81 in raised position, as shown, and when a load is placed on the commodity support the pendulums descend simultaneously with the main levers in the base of the scale. This movement in detail is as follows:

When a load is placed upon the commodity support the compound lever in the base of the scale pulls the steel-yard rod 30 downwardly. This in turn moves the intermediate lever 13 in a clockwise direction about its fulcrum 68 and this lever in turn moves the beam 14 in a clockwise direction about the fulcrum 70. This movement of the scale beam 14 allows member 35 to move upwardly and through the equalizing roller 80 slacks off the flexible tapes 83 so that they wrap on the compensating cam edges of cams 82 and allow the pendulums 81 to fall to a new position. The degree of angular movement of the pendulums is dependent on the weight of the commodity support and accordingly the rack 40 takes a new position above the normal or no load position. The movement of the rack in turn moves the indicating devices to the proper extent to indicate the weight on the commodity support.

When it is desired to weigh a commodity which is heavier than the capacity of the scale the operator first places a counterweight 33 of the proper weight on the scale beam counterbalance 32. This serves to balance the system of levers for the weight corresponding to the counterweight, and then upon placing the load on the platform the indicating devices will move to indicate the amount of load in excess of the load represented by the counterweight. In this way the exact weight can be easily and accurately determined as the indicating devices are particularly adapted to give a close and accurate indication of the weight to the operator. In addition they are automatic in action and allow the time of weighing to be cut down to a minimum. The counterweights 33 are usually carried on a bracket 34 extending to the side of the scale pedestal. They are also marked with the load that they are adapted to compensate for.

In my invention I also provide a mechanism for taking care of tare. This is shown in Fig. 1, and consists of a tare chart 46. The regular weight chart 43 is also pivoted at its center and can be moved about its center by means of a tare knob 47, which extends through a slot 48 in the housing of the scale. The operation of the tare device is as follows: The basket or other receptacle is first placed on the commodity support. The tare knob 47 is then pulled downwardly until the 0 of the weight chart 43 coincides with the pointer. The tare chart 46 is now examined to find the tare weight. After this the commodity can be placed in the receptacle and the weight of the commodity can be directly determined by noting the position of the pointer 42 with respect to the weight chart 43.

It will also be understood that I can use other tare devices as well. For example, I might use a sliding poise on beam 14 or I could attach an auxiliary beam below beam 14 and have a sliding tare poise on this beam.

The handle 36, as shown in Fig. 1, is connected with suitable mechanism for relieving the knife pivots of the load when the commodity is being placed on the commodity support. The mechanism consists of connections adapted to lift the compound lever on turning the handle 36. These devices are well known in platform scales and need not be here described.

It is to be understood that I do not limit myself to the precise form and construction shown in the accompanying drawings. What I claim as new is particularly pointed out in the appended claims.

What I claim is:

1. In a device of the class described, in combination, a scale beam of the first order, a pair of oppositely disposed normally elevated pendulums connected to the scale beam on one side of its fulcrum to counterbalance the beam, an intermediate scale lever of the second order connected with the scale beam on the outer side of the fulcrum thereof, a commodity support, and means connecting the latter to the intermediate scale lever at a point between its fulcrum and the point of connection of the scale to the lever.

2. In a device of the class described, in combination, a commodity support, an intermediate lever of the second order operatively connected to said support between its fulcrum and its opposite end, a scale beam of the first order operatively connected on one side of its fulcrum to said lever, a normally elevated pendulum connected to the scale beam on the other side of its fulcrum, and weight-indicating means connected with said scale beam and adapted to move in a forward direction as the pendulum descends under the influence of a weight on the commodity support.

3. In a device of the class described, in combination, a scale beam of the first order of leverage, an intermediate lever of the second order of leverage connected with said scale beam, pendulum means adapted to counter balance the scale beam, weight indicating means movable to an extent determined by the scale beam and counter balancing pendulum means, and a second counter balancing device associated with the scale beam whereby additional weights may be added and the capacity of the scale be increased.

4. In a scale, in combination with the usual supporting levers for the platform of the scale, a steelyard extending upwardly therefrom, a lever fulcrumed upon one end upon the frame of the scale and connected intermediate its ends with the aforesaid steelyard, a second lever of the first order positioned above and parallel with the first mentioned lever and fulcrumed intermediate its ends upon the scale frame, links connecting one end of the said lever with the free end of the first mentioned lever, a pendant on the free end of the first order lever adapted to receive weights and thereby increase the capacity of the scale, pendulum means for counterbalancing the lever system, said pendulum means being disposed over the first order lever and having a flexible tape connection therewith connecting with said lever intermediate the pendant weight and the fulcrum of the first order lever and means for indicating the extent of movement of the pendulum means.

5. In a scale in combination with the usual lever system supporting the platform of the scale; a lever of the second order suitably connected with the aforesaid lever system, a lever of the first order connected at one end with the free end of the second mentioned lever, a pendant weight at the opposite free end of the first order lever, pendulum means to counterbalance said lever system, said pendulum means having a connection with the said lever system at a point intermediate the fulcrum of the first order lever and the point of connection with the pendant weight, and weight indicating devices connected with the said system of levers and movable to an extent determined by the movement of the first order lever and the pendulum counter balancing means.

6. In a device of the class described in combination with the usual members supporting the platform of the scale, a lever of the second order suitably connected with said platform supporting members, a lever of the first order suitably connected with the second order lever at the free end thereof, a pendant weight on the opposite free end of said lever, normally elevated counterbalancing pendulum means having an operating connection with said first order lever, said connection to said lever being at a point between the point of connection of the pendant weight and the fulcrum of the lever, and weight indicating devices movable to an extent proportional to the movement of the pendulum counterbalancing means and the scale lever of the first order.

7. In a scale, in combination a scale lever of the second order of leverage, a scale beam of the first order of leverage operatively connected with the aforesaid lever, a pendant member at the free end of the scale beam of the first order, normally elevated oppositely disposed pendulums positioned above the said scale beams and adapted to counterbalance the same, said pendulums having an operating connection with the said beam at a point thereon intermediate the beam fulcrum and the point of attachment of the pendant weight, and weight indicating devices suitably associated with the scale beam and the pendulums to indicate the weight on the platform.

8. In a scale, in combination a scale lever of the second order of leverage, a scale beam of the first order of leverage connected at one end with the free end of the second order lever, a pendant on the free end of the first order lever having provisions to receive additional weights whereby the capacity of the scale may be increased, a plurality of normally elevated oppositely disposed pendulums, compensating cams associated therewith, a compensating pulley, a flexible tape wrapped over said cams and extending downwardly and looping under the said compensating pulley, said pulley having a connection with the aforesaid scale beam at a point intermediate the point of attachment of the pendant weight and the fulcrum of the beam, and a weight indicating device operatively associated with the said beam for indicating the weight compensated for by the pendulums.

9. In a scale, in combination, a scale lever of the second order of leverage, a scale beam of the first order of leverage connected at one end with the free end of the second order lever; a pendant upon the free end of the scale beam; pendulum means for counterbalancing the lever and the scale beam, said pendulum means having a connection to the first order lever or beam at a point intermediate the fulcrum and the pendant; weight indicating devices for indicating the weight on the scale; and tare devices for correcting the weight indicating device for the tare.

10. In a scale, the combination with a scale lever of the second order of leverage, a scale beam of the first order of leverage operatively connected with the aforesaid lever, a pendant member at the free end of the scale beam of the first order, a pendulum counterbalancing means positioned above the scale beam and adapted to counterbalance the same, said pendulum means having an operating connection with said beam at a point thereon intermediate the beam fulcrum and the point of attachment of the pendant weight and weight indicating device associated with the scale beam and the pendulum means to indicate the weight on the scale.

11. In a scale in combination, a scale lever of the second order, a scale lever of the first order disposed above the first lever and substantially parallel therewith, means for connecting the nose end of the lever of the second order to the power end of the lever of the first order, and a pendulum counterbalancing means for the said lever system said means being disposed above the lever of the first order and having an operating connection therewith whereby the said lever and the lever system is normally maintained in postion of equilibrium thereby.

12. In a scale, in combination, a scale lever of the second order, a scale lever of the first order, disposed above the first lever, and substantially parallel therewith, means for connecting the nose end of the lever of the second order to the power end of the lever of the first order, a supplementary weight receiver on said lever of the first order adapted to receive supplementary weights to thereby increase the capacity of the scale, and counter-balancing means connected to said lever of the first order at a point intermediate the fulcrum thereof and the position of the said supplementary weight receiver thereon.

13. In a scale, in combination, a scale lever of the second order, a scale lever of the first order disposed above the first mentioned lever, means connecting the nose end of the second order lever with the power end of the first order lever, counterbalancing means, supported above the first order lever and connected therewith to thereby maintain the said lever in normally midposition of equilibrium, and a weight indicating device connected with said first order lever to indicate the weight upon the scale.

14. In a scale, in combination, a scale lever of the second order, a scale lever of the first order, means connecting the nose end of the second order lever with the power end of the first order lever, pendulum counter-balancing means supported above said first order lever, means connecting said pendulum counterbalancing means with said lever at a point intermediate the fulcrum of said lever and the free end thereof, a rack operatively connected with said first order lever so as to be operated in unison thereby, and a weight indicating device adapted to be variably positioned by said rack in its movement.

15. In a scale, in combination, a scale lever of the first order, a scale lever of the second order, a commodity support connected with said scale lever of the second order, means connecting the nose end of said second order lever to the power end of the first order lever, a pair of oppositely disposed normally elevated pendulums supported above the first order lever, flexible elements connecting the aforesaid pendulum and said first order lever whereby the lever is supported in position of equilibrium by the said pendulums and a weight indicating device adapted to be moved in correspondence with the movement of the pendulums to indicate the load on the scale.

In testimony whereof I affix my signature in the presence of two subscribing witnesses.

JOSEPH HOPKINSON.

Witnesses:
  A. S. HENDRICKS,
  JOSEPH WALES.

It is hereby certified that in Letters Patent No. 1,339,759, granted May 11, 1920 upon the application of Joseph Hopkinson, of Dayton, Ohio, for an improvement in "Scales," an error appears in the printed specification requiring correction as follows: Page 3, line 23, claim 1, after the word "scale" insert the word *beam;* and that the said Letters Patent should be read with this correction therein that the same may conform to the record of the case in the Patent Office.

Signed and sealed this 8th day of June, A. D., 1920.

[SEAL.]

Cl. 265—62.

M. H. COULSTON,
*Acting Commissioner of Patents.*